(No Model.)

B. M. WILKINSON.
HOG PEN.

No. 500,699. Patented July 4, 1893.

Witnesses
B. S. Ober
N. W. Riley

Inventor
Benjmon M. Wilkinson,
By his Attorneys,
C. A. Snow & Co.

UNITED STATES PATENT OFFICE.

BENJMON M. WILKINSON, OF GRAPE VINE, TEXAS.

HOG-PEN.

SPECIFICATION forming part of Letters Patent No. 500,699, dated July 4, 1893.

Application filed March 30, 1893. Serial No. 468,330. (No model.)

*To all whom it may concern:*

Be it known that I, BENJMON M. WILKINSON, a citizen of the United States, residing at Grape Vine, in the county of Tarrant and State of Texas, have invented a new and useful Hog-Pen, of which the following is a specification.

The invention relates to improvements in hog pens.

The object of the present invention is to improve the construction of pens and to provide for them a feed trough, by means of which a great number of animals may be readily fed without going into a pen or inclosure.

The invention consists in the construction and novel combination and arrangement of parts hereinafter fully described, illustrated in the accompanying drawings and pointed out in the claims hereto appended.

Figure 1:
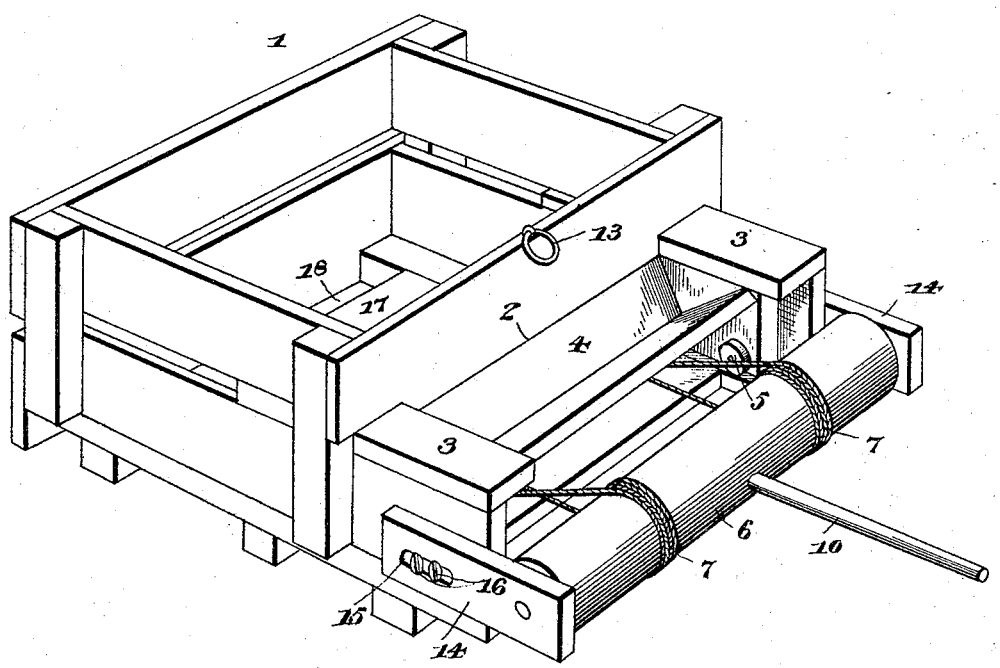
Figure 2:
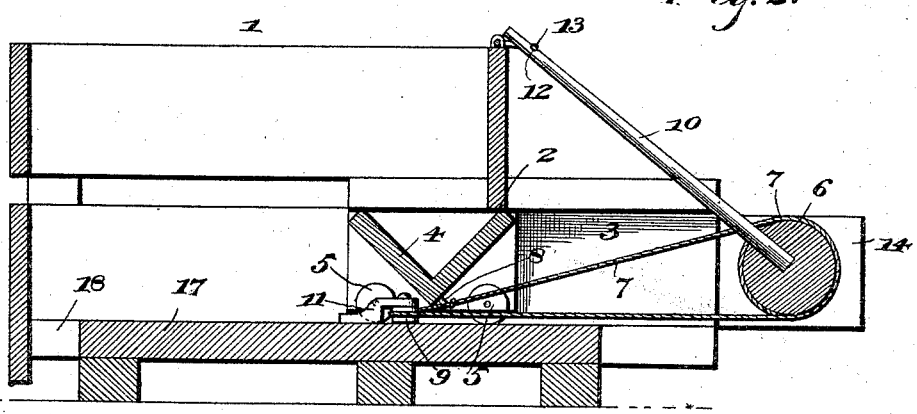

In the drawings—Figure 1 is a perspective view of a pen constructed in accordance with this invention. Fig. 2 is a vertical sectional view taken transversely of the trough.

Like numerals of reference indicate corresponding parts in all the figures of the drawings.

1 designates a pen having at one side an opening 2 and provided with opposite ways 3, extending through the opening into the bin and outward beyond the same, and receiving a sliding feed trough 4. The sliding feed trough is mounted on rollers 5, and the ways are provided with upper and lower parallel inwardly extending flanges arranged above and below the ends of the feed trough.

The feed trough is moved into and out of the bin for filling and supplying the animals with feed, by a roll or shaft 6 and a pair of ropes 7, each of which has its ends secured to an eye 8 of the feed trough, and has one portion extending rearward or inward and passing around a pulley 9 and its other portion extending forward or outward and wound around the drum or shaft. The rope or cord after passing around the shaft or roll extends rearward to the pulley 9. By rocking the roll or shaft 6 by a handle 10 the ropes are wound at the top and unwound at the bottom and vice versa, thereby moving the feed trough out or in. The pulleys 9 are arranged in recesses of blocks 11 and the handle is stepped in a socket or opening of the roll or shaft.

In order to prevent the feed trough being forced outward by animals in attempting to get at the contents, the handle is provided near its outer end with a shouldered notch 12 and is locked against outward movement by a ring 13 of the bin. The ends of the shaft or roll are journaled in adjustable bearing plates 14 which are provided with longitudinal slots 15 and are secured to the outer sides of the ways 3 by screws 16 arranged in said slots. By means of the adjustable bearing plates, the ropes, which are connected to the trough, may be retained at the desired tension, and any slack may be readily taken up.

The pen or inclosure is provided with a bottom 17, and at the rear side thereof is an opening 18 which greatly facilitates the maintenance of the pen in a clean and healthy condition.

The feed trough may be readily applied to any character of inclosure or pen and the means employed for shifting the feed trough into and out of such inclosure will enable a large and exceedingly heavy trough to be readily handled.

Changes in the form, proportion and the minor details of construction may be resorted to without departing from the principle or sacrificing any of the advantages of this invention.

What I claim is—

1. The combination of an inclosure having an opening and provided with ways extending into and out of the same, a sliding trough mounted in the ways and provided with rollers and adapted to slide into and out of the inclosure, pulleys arranged at the inner or rear side of the trough, a roll or shaft journaled in front of the trough, ropes having their ends secured to the trough and extending rearward around the pulleys and forward around the roll or shaft, and a handle connected to the roll or shaft for turning the same, substantially as described.

2. The combination of an inclosure having an opening and provided with ways extending into and out of the same, adjustable bearing plates secured to the outer ends of the ways, a trough mounted in the ways, pulleys arranged in rear of the trough, a roll or shaft journaled in said bearing plates, ropes having their ends secured to the trough and extending rearward around the pulleys and forward around the shaft or roll, a handle for turning the shaft or roll, and means for locking the shaft or roll against turning, substantially as described.

In testimony that I claim the foregoing as my own I have hereto affixed my signature in the presence of two witnesses.

BENJMON M. WILKINSON.

Witnesses:
ELMER UTTER,
J. R. SANDERS.